Figure 1:
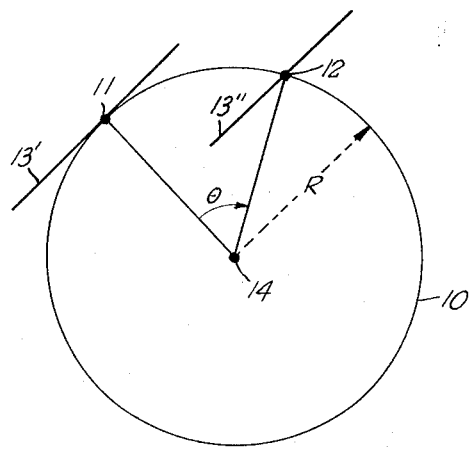

Dec. 27, 1966   CARL-ERIK GRANQVIST   3,293,923
ARRANGEMENT FOR INERTIA NAVIGATION BY MEANS OF GYROSCOPES
Filed Jan. 16, 1961                           3 Sheets-Sheet 1

INVENTOR
*Carl-Erik Granqvist*

BY *Larson and Taylor*
ATTORNEYS

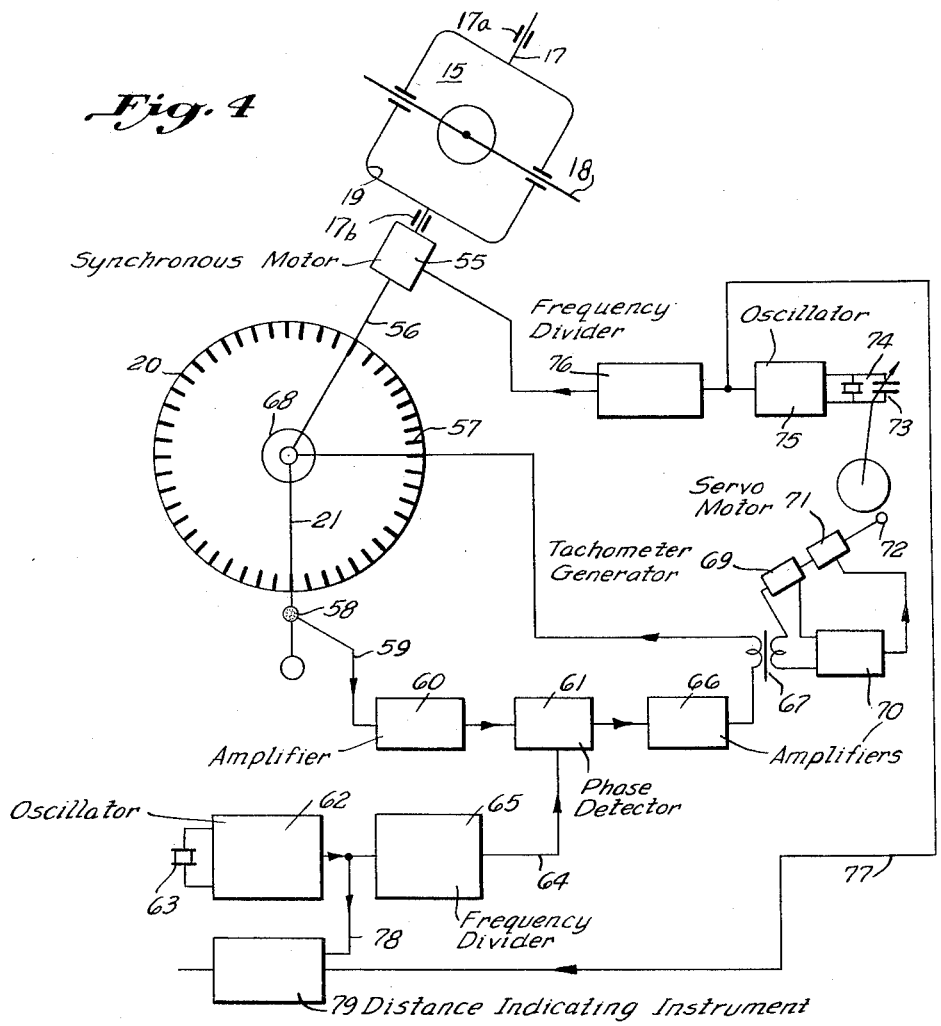
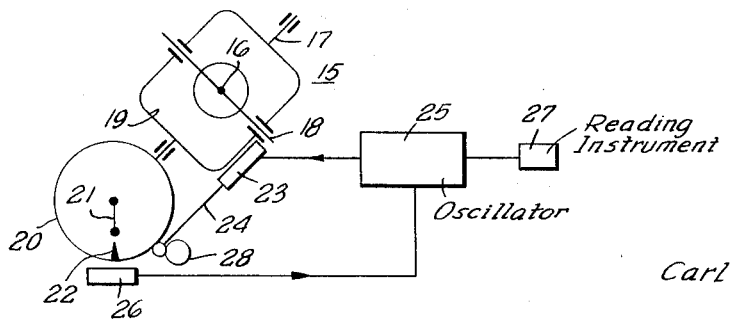

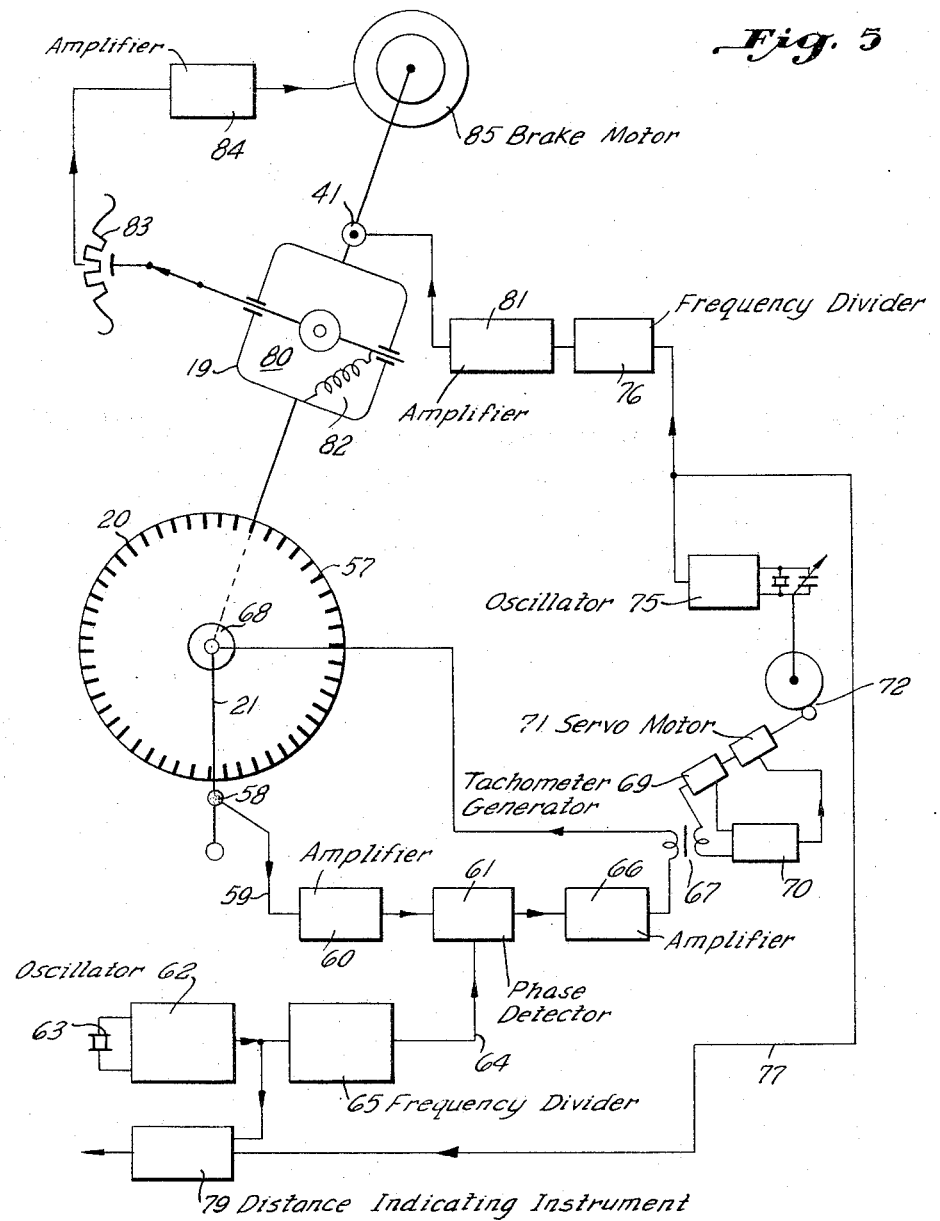

United States Patent Office 3,293,923
Patented Dec. 27, 1966

3,293,923
ARRANGEMENT FOR INERTIA NAVIGATION BY MEANS OF GYROSCOPES
Carl-Erik Granqvist, Lidingo, Sweden, assignor to Aga Aktiebolag, a corporation of Sweden
Filed Jan. 16, 1961, Ser. No. 82,964
Claims priority, application Sweden, Jan. 21, 1960, 565/60
15 Claims. (Cl. 74—5.22)

The present invention relates to a method and means of navigating a vehicle moving above the surface of the earth at high speed, such as an aircraft, by comparing the attitude of a gyroscope which maintains its orientation in space with the attitude of a device which maintains its orientation in relation to the surface of the earth, such as a pendulum. The term pendulum will be hereafter used to mean any instrument or device which is capable of indicating the direction of gravity at any point on or above the earth's surface.

Navigation by known methods of the specified kind is still subject to considerable margins of error and it is the object of the present invention to devise a method and means of achieving greater reliability and accuracy without necessitating major complications in instrumentation.

The method proposed by the invention consists in translating the rate of change of the relative attitude of gyroscope and pendulum into a change of a variable electrical frequency and in using said change of frequency as a measure of the speed of the travelling vehicle.

The apparatus proposed by the invention for performing said method comprises a gyroscope which maintains its attitude in space and a pendulum which maintains its position in the direction of gravity as well as compensating means of which one element is relatively movably coupled with or comprised in one of said instruments, for instance the gyroscope, whereas the cooperating element is coupled to the other, in such manner that a gradual change in the relative attitude of gyroscope and pendulum causes a corresponding change in an electrical signal generated by the compensating means, said signal varying the frequency of an oscillator which in accordance with said frequency change imparts a movement to the relatively movable element of the compensating means until the rate of change of the relative attitude of gyroscope and pendulum is thereby compensated and the signal generated by the compensating means remains steady or zero.

Conveniently the variable frequency may be generated by a crystal-controlled oscillator and the frequency change may be effected by varying the natural frequency characteristics of the controlling crystal.

Moreover, any change in this variable frequency may be measured by comparing the same with a constant frequency generated for instance by a second crystal-controlled oscillator, the comparison being made either by mechanical or electrical means.

Figure 3:
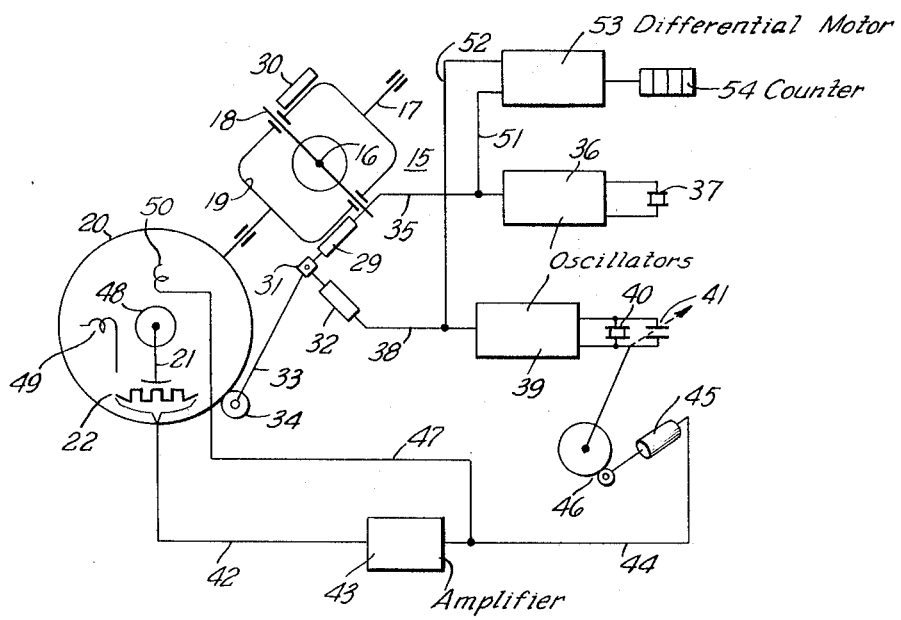

In order that the invention may be the more readily understood reference will now be made to the accompanying drawings in which FIG. 1 illustrates the principle underlying the method of navigation upon which the invention is based, and FIG. 2 illustrates the application of this principle to the method proposed by the invention, whereas FIG. 3 is a first practicable embodiment of the invention, FIG. 4 is a second improved embodiment of the invention, and FIG. 5 is a modification of the embodiment shown in FIG. 4.

Referring first to FIG. 1 this represents a cross section of the earth through its centre 14. In other words 10 is a great circle. It is assumed that a vehicle such as an aircraft, travels from point 11 to point 12 on this circle, the altitude of the vehicle above the surface of the earth being negligible in relation to the earth's radius and therefore not shown. It is desired to find the distance the aircraft has travelled from point 11 when it reaches point 12. The tangent 13' at point 11 represents the horizontal at the point where the aircraft takes off. A gyroscope on board the aircraft is arranged to maintain a reference plane, a so called platform, on board the aircraft parallel with plane 13' throughout the flight. This plane will hereinafter be referred to as a stable platform. In other words, when the aircraft reaches point 12 on the great circle the position of the stable platform will still be parallel with plane 13' as indicated by 13", but the horizontal will have turned through an angle $\theta$. This angle is the apparent angle of tilt of the stable platform in relation to the horizontal at point 12. The exact position of the horizontal can always be measured by any suitable instrument for indicating the direction of gravity, such as a pendulum, which points to the centre of the earth when free from extraneous accelerational forces, irrespectively of the position of the aircraft on its path.

The distance travelled by the aircraft at point 12 is therefore $$d = R \cdot \theta \text{ miles}$$

R being the radius of the earth in miles which is known and $\theta$ being measured in radians. The average speed $v$ of the vehicle between points 11 to 12 is therefore $$v = R \frac{d\theta}{dt}$$

The manner in which this fact is utilized in the method proposed by the present invention will now be explained by reference to FIG. 2. The gyroscope is indicated at 15. The rotor revolves on shaft 16 and is suspended in gimbal rings free to rotate on shafts 17 and 18. The outer gimbal ring 19, at least in one of its two degrees of freedom represented by rotation about shaft 17, may be regarded as constituting the stable platform. Rotatably mounted on shaft 17 is a disc 20 which carries a device for indicating the vertical, preferably a pendulum 21 suspended from its centre. The disc also bears a reference mark 22. Mounted on the outer gimbal ring 19, i.e., on the stable platform, is a synchronous motor 23, the shaft 24 of this motor being geared to disc 20 by a gear wheel meshing with teeth on the periphery of the disc. Motor 23 is thus adapted to rotate the disc on shaft 17 at a speed depending upon the speed of the motor. When the motor is stationary, the disc 20 will therefore reproduce any movement of gimbal ring 19 about axis 17. The synchronous motor 23 is driven by an alternating current of a frequency controlled by an oscillator 25 and the frequency of the oscillator is determined by a device 26 which senses any deviation of the position of the pendulum 21 from the position of reference mark 22 on disc 20. Motor 23, disc 20 with its reference mark 22 and the sensing device constitute a compensating means as will be described.

Let it be assumed that in the course of the movement of the aircraft from point 11 to point 12 in FIG. 1 the position of the stable platform (13, FIG. 1; 19, FIG. 2) changes in relation to the horizontal and the pendulum 21 therefore ceases to register with the reference mark at 22. This difference is sensed by unit 26 which generates a signal causing a change in the frequency of oscillator 25. Prior to take-off the oscillator frequency is zero, and according to the direction of flight, the ensuing deviation of the pendulum may be positive or negative, but in either case a frequency will be generated causing the synchronous motor 23 to rotate. The question of the required direction of rotation will be referred to later. The rotation of the motor will therefore realign the index mark with the pendulum and tend to maintain the pendulum and the mark in register compensating the relative motion between gimbal ring 19 and pendulum 21. The frequency of the oscillator 25 can then be taken as a measure of the speed of the aircraft along its great circle path, and an instrument 27 can be provided upon which this speed can be read. Moreover, the revolutions performed by shaft 24 of the motor can be taken as a measure of the distance travelled and can be read on a suitable counter 28.

It will be readily appreciated that a system built exactly in the manner illustrated in FIG. 2 would be impracticable for various reasons, the arrangement in FIG. 2 being merely intended to clarify the principle upon which the solution of the problem is based. Clearly, the frequency of an oscillator cannot be controlled to vary in the immediate vicinity of zero for the purpose of controlling small rotations in either direction of a synchronous motor. Also the outer gimbal ring of a gyroscope could not be loaded with the weight of a motor without the stability of the gyro being upset.

FIG. 3 therefore illustrates an instrument in which the objections to the arrangement according to FIG. 2 have been eliminated, and which constitutes a practicable embodiment of the principle which has been explained.

Again the rotor of the gyro revolves on a shaft 16 suspended in an inner gimbal ring, which moves around the shaft 18, and this in turn is suspended in the outer gimbal ring 19, which moves around the shaft 17, the outer gimbal ring 19 representing the stable platform. This outer ring 19 carries a synchronous motor 29 and a counterweight 30 for balancing the motor. The output shaft on the synchronous motor 29 in this form of construction is not arranged directly to drive disc 20 but it drives a differential 31 which has a second input driven by a second synchronous motor 32. The output shaft 33 of the differential drives a gear wheel 34 which meshes with peripheral teeth on disc 20, and it will be understood that the output shaft will revolve at a speed representing the difference in speeds between the two synchronous motors 29 and 32, and that disc 20 will not rotate if both synchronous motors revolve at the same speed. Now the speed of synchronous motor 29 is determined by the frequency of an oscillator 36 with which it is electrically connected by leads 35, the frequency of the oscillator being controlled and kept constant by a crystal 37. Similarly, the speed of motor 32 is determined by a second oscillator 39 with which it is electrically connected by leads 38. This second oscillator 39 is likewise controlled by a crystal 40 but the output frequency is capable of being controllably slightly varied in either direction by a capacitor 41 shunted across crystal 40, said variation being in turn determined by the deviation of pendulum 21 in either direction from a zero position in relation to a sensing device 22, said zero position corresponding to the reference index in FIG. 2. The sensing device may be of any suitable kind. For instance it may be an optical detector comprising photocells or it may be a magnetic type of detector with a so-called E-core, cooperating with an armature affixed to pendulum 21. Such devices are known to the art and no further description in the present context will be required. The output 42 of the sensing device 22 is connected with an amplifier 43 for amplifying the signal and the amplified output signal is then applied through a lead 44 to a servo-motor 45 which through gearing 46 controls the adjustment of capacitor 41 and hence varies the output frequency of oscillator 39 according to the deviation of the pendulum from zero position.

The output of amplifier 43 through leads 47 also energizes one winding 50 of a motor which is arranged to have a damping effect on the relative movement of disc 20 and pendulum 21. A very simple form of such a motor would be an asynchronous motor having a disc type rotor 48 and two field windings 49 and 50, one of said windings, namely 49, being fed with the same frequency as the sensing device 22, whereas the amplified signal frequency from amplifier 43 flows through the other winding 50 in a direction creating a torque contrary to the direction of relative motion between pendulum 21 and disc 20. The outputs of both oscillators 39 and 36 are connected by leads 51 and 52 with a differentially wound motor 53 which revolves at a speed controlled by the difference frequency between the two oscillators. The output shaft of this motor drives a counter 54.

The system illustrated in FIG. 3 functions as follows:

During flight the stable table controlled by the gyro gradually tilts out of the horizontal in relation to the ground. The pendulum will therefore swing away from its zero position in the one or other direction and, after amplification in amplifier 43, the output signal of the sensing device will cause the servo motor to adjust the variable capacitor 41 and thereby to vary the output frequency of oscillator 39.

It will be understood that before the vehicle started on its journey pendulum 21 was in zero position in relation to the sensing device and the two oscillators 36 and 39 had been set to deliver the same frequencies. When the aircraft is in motion the pendulum will gradually deviate from zero position if the frequencies remain at their original setting. However, the sensing device 22 through amplifier 43, servo 45, gear wheel 46 and capacitor 41 changes the frequency of oscillator 39 in proportion to this deviation. Consequently a difference will arise between the speeds of the two synchronous motors 29 and 32, and the output shaft 33 of differential 31 will rotate disc 20 until the pendulum is again in zero register with the sensing device.

In practice, as soon as the vehicle travels at a constant speed on its course, pendulum 21 will gradually swing away from zero position in relation to the stable table at a constant slow angular speed, and the sensing device will adjust the frequency of oscillator 39 to a value at which the disc will be rotated at a rate to match the angular speed of the pendulum. The difference between the frequencies applied through leads 51 and 52 to motor 53 will therefore cause motor 53 to rotate at a speed which is exactly proportional to the speed of the vehicle and the total number of turns of the motor, measured by means of the counter 54, will represent the distance travelled in the direction in which the outer gimbal ring 19 maintains a stable reference plane.

It has been assumed above that the vehicle moved along a great circle of the ground. This must not necessarily be the case, but the vehicle can of course, move in any deliberate direction. In practical use provisions have therefore to be taken for measuring the movement components in two directions, which should preferably be perpendicular to each other, and which may in the simplest case coincide with the meridian line direction and the parallel line direction of the ground. A very simple way of doing this will be to use two different apparatus of the kind described, each being separately controlled by a stabilization gyro, keeping the one gimbal shaft 17 in the meridian line direction and the other gimbal shaft in the parallel line direction of the ground. These latter gyros, therefore, are not the same ones as the gyros, shown in the drawing. One will then also get two indications of speed and travelling way, but they can easily be combined vectorially into an indication of speed, distance and direction, and they will then give a complete aid for navigation.

The operation of the system depends upon the pendulum remaining substantially unaffected by temporary accelerations and decelerations of the vehicle itself. In order to damp out these temporary accelerations and decelerations the damping device 48, 49 and 50 has been provided. The damping effect on the relative motions of pendulum and disc is sufficient to eliminate the effect of temporary accelerations of the said kind and to prevent pendulum oscillations due to overcontrol.

It will be understood that the particular method adopted in FIG. 3 of varying the frequency of oscillator 39 by means of a variable capacitor connected in parallel with the crystal is only illustrative and that various methods can in practice be used to achieve the same result. For instance, variation of the natural frequency of the crystal can be accomplished by subjecting the crystal to mechanical forces, or pulse frequencies can be used in the transmission and the speed of one of the synchronous motors varied by the suppression of individual pulses. Yet another way of carrying out the invention is illustrated in FIG. 4, which shows an embodiment which also has certain other advantages.

In FIG. 3 the outer gimbal ring carries two synchronous motors 29 and 32 as well as a differential 31 and a counter-weight 30. Consequently the overall mass of the gimbal is quite considerable. Its inertial resistance to movement will therefore be correspondingly high so that the whole gyroscopic assembly will be sluggish and unresponsive, decreasing the accuracy of control. The embodiment which will now be decreased eliminates these drawbacks.

In this embodiment one element of a synchronous motor 55, for instance the stator, is directly mounted on the shaft 17, of the outer gimbal ring 19 of the gyroscope suspension. This shaft 17 is supported in bearings 17a and 17b, which are mounted on the frame of the aircraft. The rotor of the motor 55 is connected with the shaft 56 which carries the disc 20, the motor thus being adapted to rotate the disc coaxially with the shaft 17 of the outer gimbal ring 19. Disc 20 is provided with peripheral teeth 57 which optically cooperate with a pendulum 21 carrying a photocell detector 58. A beam of light passing through the gaps between the teeth on to the photocell gives rise to the generation of pulses when the disc revolves in relation to the pendulum, the pulse frequency being determined by the speed of rotation of and the number of teeth on the disc. The output of the photocell 58 is connected with an amplifier 60 which in turn feeds the pulses to a phase detector 61. The phase detector 61 is an element which compares the phase of two currents of like frequency. One of these is the amplified pulse frequency from photocell 58, whereas the other is derived from an oscillator 62 corresponding to oscillator 36 in FIG. 3 and which supplies a constant frequency controlled by a crystal 63, corresponding to crystal 37 in FIG. 3. Generally, if the frequency generated by the oscillator 62 shall be kept sufficiently constant, it cannot be as low as that from the photocell 58 which is determined by the speed of rotation of and the number of teeth on the disc, unless the number of teeth is made unpractically high. In order to permit the phase detector to compare the two frequencies it is therefore first necessary either to multiply the frequency supplied by the photocell or to demultiply the frequency from the oscillator. In the illustrated form of consturction a frequency demultiplier or divider 65 is interposed between the oscillator 62 and the phase detector 61.

The speed of rotation of disc 20 by synchronous motor 55 is determined by the frequency of an oscillator 75, corresponding to oscillator 39 in FIG. 3 and controlled by a crystal 74, corresponding to crystal 40 in FIG. 3. Conveniently this frequency is adjusted to be the same as that supplied by oscillator 62 and is demultiplied by a frequency divider 76 which has a demultiplication factor commensurate with that of frequency divider 65. However the frequency of oscillator 75 can be varied within limits by adjustment of a variable capacity condenser 73 placed across crystal 74, and corresponding to condenser 41 in FIG. 3.

Due to the frequency supplied from oscillator 75 and frequency divider 76, the disc 20 will rotate slowly, even if the gimbal ring, 19 should be in standstill, a pulse frequency being generated in the photocell 58 and fed to the phase detector 61, over amplifier 60. This pulse frequency should in normal cases be equal to the frequency of the oscillator 62 after frequency division, and there should be no output in the conduit from phase detector 61 to amplifier 66. The frequency division in the frequency dividers should be chosen different in order to satisfy this demand.

Let it now be assumed that the vehicle, aircraft, or the like, starts on its journey and that gimbal ring 19 begins to turn. The stator of motor 55 participates in this movement and consequently there will be a proportionate acceleration or deceleration in the speed of rotation of disc 20 since the motor rotates the disc at constant speed in relation to the gimbal, but on this speed the proper speed of movement of the gimbal is superimposed. The input frequencies of the phase detector 61 will therefore now differ.

The output frequency of the phase detector has an amplitude which is proportional to the difference between the two input frequencies. This output current is further amplified in the amplifier 66 and then flows through the primary of a transformer 67 as well as through one of the windings of a damping device 68 which corresponds in construction with the damping device described by reference to FIG. 3 where it is indicated by 48–49–50. The current from the secondary winding of transformer 67 is again amplified in an amplifier 70 and is then used to drive a servo motor 71. The servo motor is coupled with a tachometer generator 69 connected in series with the transformer secondary and amplifier 70. The tachometer generator delivers a frequency which is in phase opposition to the voltage induced in the transformer secondary by the output current from amplifier 66. Consequently, when the tachometer generator output is equal to the voltage induced in the transformer secondary by the current from amplifier 66, the servo motor will have performed a number of revolutions which is proportional to the current appearing in the output of the phase detector 61. By means of a pinion 72 the servo motor varies the capacity of condenser 73 which modifies the frequency of crystal 74 controlling oscillator 75 which through frequency divider 76 determines the speed of synchronous motor 55 as already described.

The speed of rotation of disc 20 will thus be changed back to the normal number of revolutions which is proportional to the fixed frequency of oscillator 62, the rate of turn of the gimbal thus being compensated.

There will therefore now be a difference between the frequencies generated by oscillators 75 and 62. The frequency from oscillator 75 is applied through a lead 77 and that from oscillator 62 through a lead 78 to a unit 79 which measures the frequency difference in the same way as does the instrument marked 53 in FIG. 3, namely by rotation of an output shaft connected with a counter, such as that marked 54 in FIG. 3. If the flight takes place along a great circle, the reading of the counter may be calibrated in terms of distance travelled on this great circle course in the direction in which the gimbal ring 19 remains stable.

The manner in which this system functions may now be considered in greater detail. Let it be assumed that during a flight from point 11 to point 12 in FIG. 1 disc 20 revolves at a speed of $n$ R.P. hour, and that the number of pulses generated by the photocell 58 is $p$ pulses per revolution. In the course of 1 hour the total number of pulses will therefore be $n \cdot p$ pulses. Let it be further assumed that point 12 is reached by the vehicle at the end of exactly one hour. The angle of deflection of the pendulum in relation to the outer gimbal ring will then be equal to angle $\theta$ and the total number of pulses generated during this hour will be increased by $$\frac{p \cdot \theta}{360}$$

pulses.

If the demultiplication factor of the frequency dividers is assumed to be $x$, then the number of additional pulses generated by the oscillators whilst travelling a distance of one minute of arc on a great circle course would be $$\frac{p}{360} \cdot \frac{x}{60}$$

a convenient number of pulses to generate in the course of such a distance may be 10. This will be achieved if $$10 = \frac{48}{360} \cdot \frac{x}{60}$$

that is to say if the demultiplication factor is 4500. Furthermore, let it be assumed that the speed of revolution disc 20 is 10 r.p.m. or $\frac{1}{6}$ revolution per second, during which time the photocells therefore generate 8 pulses and the oscillators 8 times 4500 or 36,000 pulses. This would then represent a convenient normal frequency for the oscillators, and it may be noted that 10 pulses per minute of arc is the equivalent of one pulse per cable-length, so that a reading of distance by counting pulses is very simple.

The accuracy which is attainable in a system of such a kind can be readily ascertained by a brief calculation. At a normal ground speed the difference between the frequencies generated by the two oscillators 62 and 75 should be in the neighbourhood of $7 \times 10^{-5}$ of the normal frequency. It is known that the stability of a crystal-controlled oscillator is in order of magnitude about $1 \times 10^{-7}$ or $1 \times 10^{-8}$. The maximum error which may occur should not therefore be greater than $\frac{1}{700}$ to $\frac{1}{800}$ of the distance travelled.

The embodiment of the invention which has just been described is capable of further simplification by replacing the synchronous motor 55 in FIG. 4 and the gyroscope 15 by some other rotating device which maintains its position in space and which is driven at a speed determined directly by the frequency of oscillator 75. Such a device might take the form of a centrifugal governor. As known the phase position of a centrifugal governor is not affected by gravity. Alternatively, a speed-controlled gyroscope, a so called rate gyro, may be used for the purpose in question. The moment of precession between the inner and the outer gimbal ring of such a gyroscope directly creates a proportional speed of precession movement and if the motor driving the gyroscope rotor is directly controlled by the oscillator the moment of precession can be made to depend directly upon the frequency delivered by oscillator 75.

A system which makes use of this idea is illustrated in FIG. 5. This arrangement corresponds with the embodiment shown in FIG. 4 excepting in the above mentioned respects. The gyroscope motor 80 is directly driven through the frequency divider 76 and an amplifier 81 at a speed determined by oscillator 75. However, a constant torque is applied between the gimbal rings, for instance, by a spring 82 between the outer gimbal ring 19 and the inner gimbal ring or between the frame of the aircraft, and the outer gimbal ring 19. The shaft 18 is kept in standstill as explained below, and consequently, the precession generated by this torque will cause disc 20 to rotate at a speed proportional to the torque. The sensing device 83 is directly connected with the outer gimbal ring and the voltage derived from this sensing device when the rotor precesses is applied to a braking motor 85 after amplification in unit 84. In this way a rotation of the outer gimbal ring 19 will be obtained with an extremely constant speed, proportional to the torque and corresponding to the rotation of shaft 56 in FIG. 4.

The moment of precession M of a gyroscope is $$M = \frac{d\alpha}{dt} \cdot \omega_0 \cdot I_p$$

where $d\alpha/dt$ is the rate of turn of the gimbal shaft, $\omega_0$ is the angular speed of rotation of the rotor and $I_p$ is the moment of inertia of the rotor.

Spring 82 causes this torque of precession M but is also influenced thereby so that there is a tendency for shaft 18 to move and so that the voltage derived from the sensing device 83 will only be zero when the rate of tilt $d\alpha/dt$ has a given value determined by the power of spring 82. If this rate of tilt changes, the sensing device 83 will deliver a voltage which through amplifier 84 causes motor 85 to change the speed of rotation of the rotor and consequently the rate of tilt until balance has been restored. It will therefore be understood that the change in the rate of precession of the gyro is here utilised for adjusting the speed of rotation until a state of balance has been restored, a change of $d\alpha/dt$ being compensated by a corresponding change of $\omega_0$.

In the above explanation it has been assumed that the direction of gravity as a reference for detecting the motions of the stable plane of the gyroscope is established by a pendulum. Other devices, such as a spirit level could in principle likewise be used. However, the use of a pendulum has the advantage that its position can be simultaneously employed to serve other purposes, for instance for controlling an artificial horizon.

In the above explanations no account has so far been taken of the rotation of the earth on the gyroscope. It will be understood that the effect of the rotation of the earth in relation to the vehicle will have the same effect as motion of the vehicle in relation to the earth in the opposite direction. In order to clarify this effect, let it first be assumed that the vehicle is at the equator and that the shaft 17 of disc 20 is regarded, which belongs to the apparatus coinciding with the meridian line, that is to say that its shaft 17 is parallel with the axis of rotation of the earth. The counter would then indicate not only the component of the speed of the vehicle along the meridian but also superimposed thereon a ground speed equal to the speed of the earth under the vehicle, i.e. 900 minutes of arc per hour. Conversely if the axis 17 of the other apparatus is regarded, the rotation of the disc of which is east to west, i.e. normal to the direction of the axis of rotation of the earth and coinciding with the parallel line, then the pendulum will not indicate this rotation of the earth. Therefore by rotating disc 20 it is possible to determine, the direction of rotation of the earth and hence to find the North-South direction.

Similarly a correction can easily be made if the gyroscope is subject to "drift." As known, if a gyroscope is not exactly statically and dynamically balanced the rotor shaft tends slowly to perform a movement defining the surface of a cone. This is called drift. By first running the gyroscope in a given attitude for a period of time and then turning it upside down the existence and magnitude of drift can be easily established and a suitable correction made.

The description of the several embodiments is based upon the tilt or rotation of the outer gimbal frame about the axis of disc 20. It will be readily understood that correct results will be attained only if the vehicle travels in a direction which is perpendicular to this axis. For a complete navigational system as mentioned above two of the above described instruments are therefore required and they should preferably be placed so that their gimbal shafts are relatively perpendicular. For instance, one may be placed to align with the north-south and the other with the east-west direction. The instrument in which this axis points from north to south therefore measures the change in longitude, whereas the other measures the change in latitude of the travelling vehicle. As has been mentioned, the indications of the latter instrument must be corrected for the effect of rotation of the earth. The magnitude of the correction naturally varies with the cosine of latitude.

In order to permit these corrections to be accurately made the north-south and east-west orientation of the gimbal axes must be maintained. To this end the two gyro-systems must be coupled with a third directional gyro revolving in a plane normal to the two others.

Finally, it should be mentioned that at take off the pendulum devices may be subjected to very high accelerations which may seriously impede the systems in finding proper positions of balance. As soon as the vehicle has assumed a steady cruising speed the gyroscopic device according to the invention should be checked to ensure that the indicated speed actually agrees with the actual speed. This can be done for instance by providing on board the aircraft as well as on the ground at the airfield from which the aircraft took off a radio-frequency crystal-controlled oscillator of equal frequency. The speed of travel can then be checked by comparing the frequency generated by the oscillator on board the aircraft with the frequency received from the transmitter on the ground and by assessing the speed from the observed Doppler effect. The instrument on board the aircraft for measuring the phase shift may be directly used for setting and correcting the gyroscopic navigational equipment.

It will be readily understood that the embodiments which have been described are merely illustrative and that modifications in detail can be devised within the scope of the principle with underlies the invention.

What is claimed is:

1. A navigational system for a vehicle moving at high speed above the surface of the earth and comprising, a gyro-controlled device which maintains its orientation in space, a second device which changes its orientation in space in response to the direction of terrestrial gravity, a rotatable element mounted independently of said gyro-controlled device and having a predetermined relationship with said second device, means for generating a voltage having a frequency proportional to the rate of deviation between said rotatable element and said second device, means coupling said gyro-controlled device and said rotatable element and responsive to said generated voltage for rotating said rotatable element to re-establish said predetermined relationship between said rotatable element and said second device thereby compensating for the deviation therebetween, and means connected to said voltage generating means for reading said voltage frequency to indicate the speed of the vehicle.

2. A navigational system as claimed in claim 1 comprising a variable frequency oscillator for generating the electrical frequency in response to the rate of change of the relative orientation of the devices, and sensing means responsive to any change in the relative position of said rotatable element and said second device for controlling the frequency of said oscillator.

3. A navigational system, as claimed in claim 2 and comprising a synchronous motor for imparting rotary motion to said rotatable element, the speed of said rotation depending upon the frequency of the variable frequency oscillator.

4. A navigational system as claimed in claim 3 in which the response of said sensing means to a relative change in the position of said second device and said rotatable element is the generation of an electrical signal which varies the frequency of the oscillator until the resultant motion imparted by the motor to the rotatable element is sufficient to compensate said relative change.

5. A navigational system as claimed in claim 4 and further comprising a constant frequency oscillator for the generation of a constant frequency which is equal to the basic frequency of the variable frequency oscillator, and means for comparing the frequency change of the variable frequency oscillator with the constant frequency of said constant frequency oscillator.

6. A navigational system as claimed in claim 5 and comprising synchronous motors driven by said two oscillators respectively, a differential having an input shaft driven by said synchronous motors in such manner that the output shaft of the differential revolves at a speed depending upon the frequency change of the variable frequency oscillator and imparts the required rotary motion to the rotatable element for compensating the change in the relative orientation of the gyro-controlled device and said second device.

7. A navigational system as claimed in claim 6 and comprising means connected to the differential output shaft for measuring the speed of the vehicle and its total number of revolutions as a measure of the distance travelled.

8. A navigational system as claimed in claim 5 wherein said rotatable element is a disc driven by the variable frequency oscillator at an angular speed in relation to the gyro-controlled device depending upon the frequency of said variable frequency oscillator.

9. A navigational system as claimed in claim 8, in which the rotatable disc is provided with teeth around its periphery for cooperation with said sensing means in such manner that the sensing means will generate pulses at a frequency depending upon the speed of rotation of the disc in relation to the second device.

10. A navigational system as claimed in claim 9 in which the sensing means is a photo-electric detector which generates electrical pulses at a pulse frequency determined by the number of teeth on the rotatable disc and the speed of the disc in relation to the second device.

11. A navigational system as claimed in claim 9 in which a difference signal is generated between the pulse frequency of the sensing device and the constant frequency oscillator, servo means receiving said difference signal for resetting the frequency of the variable frequency oscillator according to the magnitude of said difference signal and thereby reducing the difference signal to zero.

12. A navigational system as claimed in claim 11 in which the servo means is a servo motor which adjusts the frequency of the variable frequency oscillator, a tachometer generator driven by said servo motor and having its output counterconnected with the input circuit of the servo motor.

13. A navigational system as claimed in claim 3 and comprising a frequency divider having a suitable demultiplication factor connected between said variable frequency oscillator and said synchronous motor, gimbal mounting means for the gyro-controlled device, one of the stator and rotor of said synchronous motor being mounted on the gimbal shaft of the gyro-controlled device and the other part being mounted on the shaft of the rotatable disc.

14. A navigational system as claimed in claim 4 and comprising damping means for said second device energized by the signal which varies the frequency of the variable frequency oscillator.

15. A navigational system as claimed in claim 5 and comprising an integrating device for electrically measuring and evaluating the difference between the frequencies of the variable frequency oscillator and the constant frequency oscillator to indicate the distance the vehicle has travelled.

References Cited by the Examiner
UNITED STATES PATENTS

| | | | |
|---|---|---|---|
| 1,988,458 | 1/1935 | Minorsky. | |
| 2,193,707 | 3/1940 | Baumann | 33—206.5 |
| 2,469,786 | 5/1949 | Rieber | 318—28.1 X |
| 2,752,792 | 7/1956 | Draper et al. | 75—5.34 |
| 2,954,700 | 10/1960 | Deschamps | 74—5.6 X |
| 2,968,957 | 1/1961 | Condie et al. | 75—5.47 |

OTHER REFERENCES

A Variable-Radio-Frequency-Follower System, by R. F. Wild. Proceedings of the Institute of Radio Engineers, volume 36, No. 2, February 1948.

FRED C. MATTERN, Jr., *Primary Examiner.*

BROUGHTON DURHAM, *Examiner.*

K. DOOD, T. W. SHEAR, *Assistant Examiners.*